Dec. 21, 1965  I. J. LANKFORD  3,224,260
COMPRESSION TESTER FOR INTERNAL COMBUSTION ENGINES
Filed Aug. 7, 1961  2 Sheets-Sheet 1
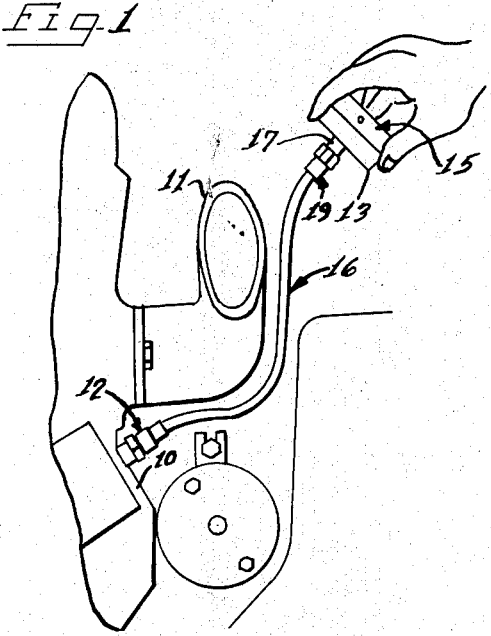
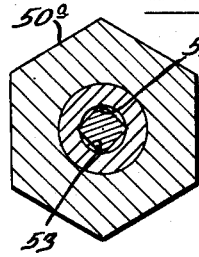
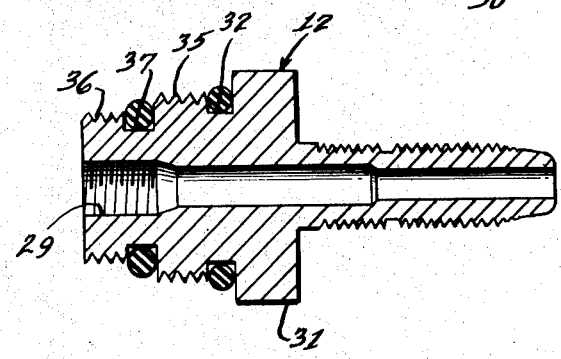
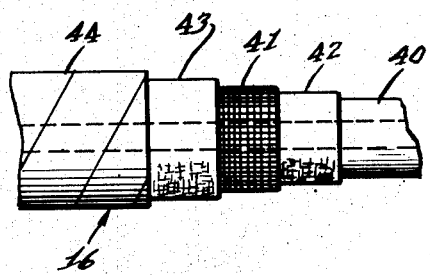
INVENTOR.
Ivan J. Lankford
BY
Hill, Sherman, Meroni, Gross & Simpson
ATTORNEYS Dec. 21, 1965   I. J. LANKFORD   3,224,260
COMPRESSION TESTER FOR INTERNAL COMBUSTION ENGINES
Filed Aug. 7, 1961   2 Sheets-Sheet 2
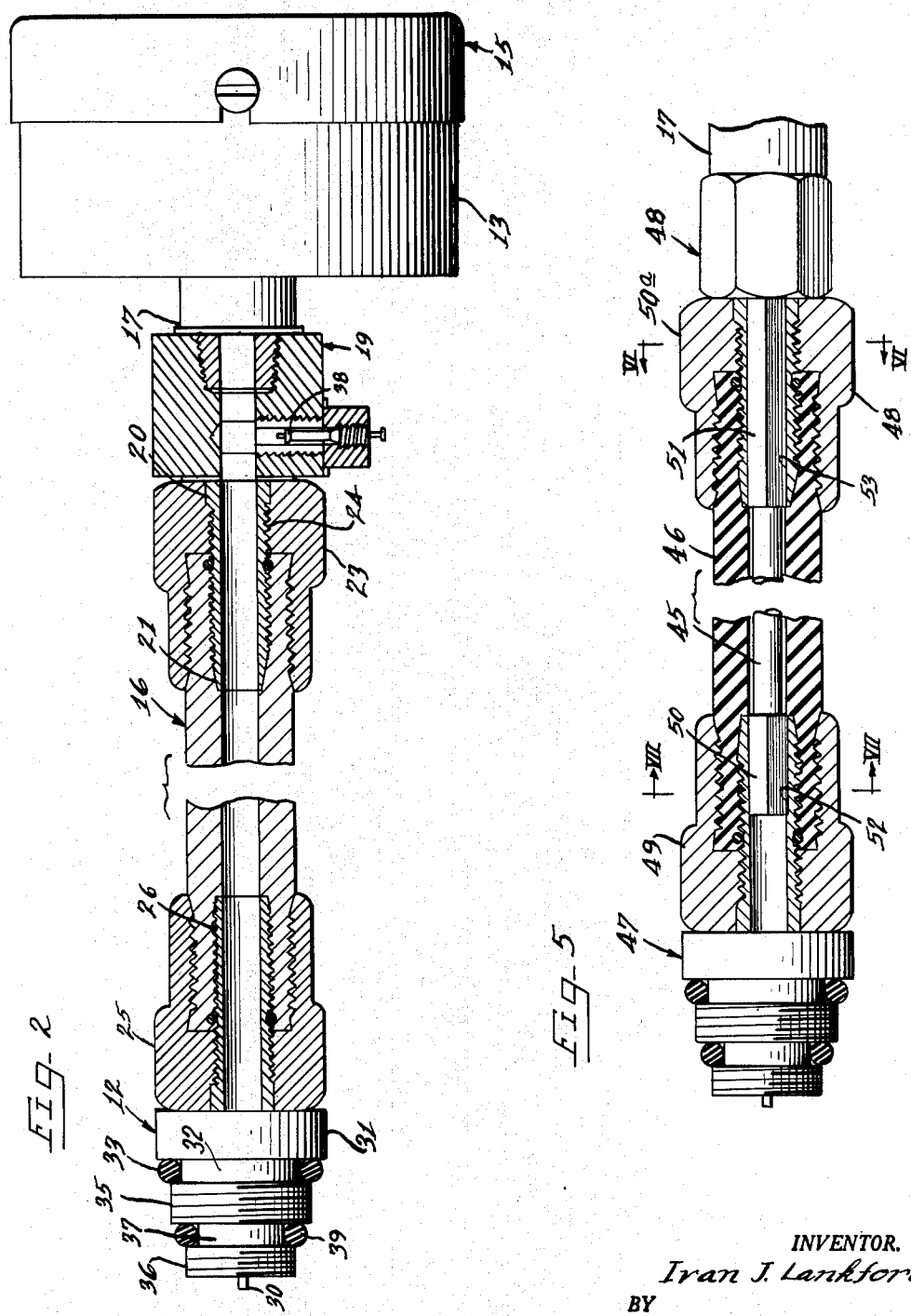
INVENTOR.
Ivan J. Lankford
BY
ATTORNEYS United States Patent Office 3,224,260
Patented Dec. 21, 1965

3,224,260
COMPRESSION TESTER FOR INTERNAL
COMBUSTION ENGINES
Ivan J. Lankford, Chicago, Ill., assignor to Peerless Instrument Company, Chicago, Ill., a corporation of Illinois
Filed Aug. 7, 1961, Ser. No. 129,633
3 Claims. (Cl. 73—116)

This invention relates to improvements in compression testers for testing the compression in the cylinders of internal combustion engines and the like.

A principal object of the invention is to provide a simple and improved form of compression tester enabling a spark plug hole fitting to be readily threaded in the spark plug hole of the engine by using the gauge head to transmit torque to the fitting, when the gauge head is disposed in various angular positions with respect to the fitting.

A further object of the invention is to provide an improved form of compression tester for testing the compression of the cylinders of internal combustion engines, utilizing a flexible drive from the gauge to the threaded spark plug hole fitting, in which the gauge head transmits torque to the fitting through the flexible drive and in which the flexible drive serves as a pressure conduit for conducting air under pressure from the cylinder to the gauge.

Still another object of the invention is to provide a compression tester particularly adapted to thread a fitting for a compression gauge into the cylinder head of an internal combustion engine in which a pressure conduit and drive connection is provided from the gauge to the fitting, so arranged as to reach the inaccessible spark plug holes of internal combustion engines.

These and other objects of the invention will appear from time to time as the following specification proceeds and with reference to the accompanying drawings wherein:

FIGURE 1 is a diagrammatic view in side elevation illustrating the threading of the compression tester fitting in the spark plug hole of an internal combustion engine by turning movement of the gauge head;

FIGURE 2 is an enlarged plan view of the compression tester showing the flexible conduit connecting the gauge head to the spark plug hole fitting and connectors therefor in longitudinal section;

FIGURE 3 is a longitudinal sectional view of the spark plug hole fitting;

FIGURE 4 is an expanded view of a form of flexible conduit that may be utilized to transmit pressure to the gauge and thread the spark plug hole fitting in a spark plug hole;

FIGURE 5 is a sectional view taken through a modified form of flexible drive connection and conduit, embodying the principles of my invention;

FIGURE 6 is a sectional view taken substantially along lin VI—VI of FIGURE 5; and FIGURE 7 is a sectional view taken substantially along line VII—VII of FIGURE 5.

In the embodiment of the invention illustrated in FIGURES 1, 2, 3 and 4 of the drawings, I have shown in FIGURE 1 a portion of an internal combustion engine having a cylinder head 10 and an exhaust manifold 11 spaced above the spark plug holes in the cylinder head. I have also shown a fitting 12 in the process of being threaded within a spark plug hole by turning a gauge head 13 of a compression gauge 15 by transmitting the torque from the gauge head 13 to the fitting 12 through a flexible conduit 16, which serves not only to transmit torque to the fitting 12 and permit a drive to the fitting around corners, with the hand turning the gauge head free from the hot exhaust manifold, but also serves to conduct fluid under pressure from the cylinder to the gauge head. The gauge 15 may be a conventional form of compression testing gauge well known to those skilled in the art so need not be shown or described in detail.

The gauge head 13 has a pressure inlet connection 17 leading thereinto having a hose connector 19 threaded thereon. The hose connector 19 has a nipple 20 extending therefrom having a tapered outer end portion 21, tapered to accommodate the flexible conduit or hose 16 to be threaded thereon. The connector 19 also has a threaded portion 24 spaced from the threaded portion, along which the flexible conduit 10 is threaded, having a hose clamp or adapter 23 threaded thereon and securely clamping the hose to the nipple 20. In connecting the hose to the nipple 20, the adapter 23 may first be threaded on the end of the hose. The hose may then be threaded on the end of the nipple until the adapter 23 comes into engagement with the threaded portion 24, at which time the hose and adapter are tightened on the nipple to effect a seal between the hose and nipple.

The opposite end of the hose from the connector 19 has an adapter 25 threaded thereon. The hose and adapter 25 are then threaded on a nipple 26 of the spark plug hole fitting 12 and clamped thereto by said adapter. The fitting 12 has an internally threaded portion 29 to accommodate a check valve 30 to be threaded therein. The check valve 30 may be similar to a tire valve core, with a lighter spring (not shown) than is usual with such cores, loading the check valve to open at relatively low pressures. The check valve 30 is positioned by the fitting in the compression chamber of the internal combustion engine to provide true compression readings.

As shown in FIGURE 3, the fitting 12 has a head 31 with an annular recess 32 for an O-ring 33, extending around the opposite side of said head from the coupling or adapter 25. The fitting 12 also has a large diameter threaded portion 35 extending from the O-ring 33 toward the outer end of said fitting, a small diameter threaded portion 36 extending to the end of said fitting and a groove 37 for an O-ring 39 separating the threaded portions 35 and 36 of said fitting.

The threaded portion 36 of the fitting 12 is provided to accommodate the fitting to be threaded within a 14 mm. spark plug hole, while the large diameter threaded portion 35 is provided to accommodate the fitting to be threaded within an 18 mm. spark plug hole.

The flexible conduit 16 is shown in FIGURE 4 as being an armored conduit having a tubular rubber core 40 along which the compressed gases flow from the cylinder to the gauge 15. The core 14 is covered by a layer of woven wire 41 woven about a cotton fabric layer 42. The woven wire layer 41 is then covered by a cotton fabric layer 43 covered by an outer layer of rubber fabric 44 which may be wound thereabout.

It should be understood that the core and outer cover of the conduit 16 may be either rubber or neoprene or one of the well known substitutes for rubber and that various forms of conduits may be used, provided they have the torsional strength to form torsion drives, tightly threading the fittings 12 into spark plug holes, and the flexibility to accommodate the turning of the fitting and transmit torque around corners with the hands free from the hot exhaust manifold.

In checking the compression of the cylinders of an internal combustion engine, as each spark plug is removed, the fitting 12 is inserted in the spark plug hole and the gauge head 13 is then turned by the hand, as shown in FIGURE 1, to thread the fitting 12 into the spark plug hole of the engine, without the use of wrenches heretofore necessary.

When the fitting is threaded within the spark plug hole, the engine may then be cranked and the gauge may be watched and a reading taken. After the reading is taken, the gauge head 13 may be turned by the hand to unscrew the fitting from the spark plug hole. The check valve 30 may then be released to release pressure from the conduit 23. The next cylinder may then be tested.

In FIGURE 2, I have shown a relief valve 38 threaded in the side wall of the hose connector 19, for releasing pressure from the gauge head and flexible conduit 16, when it is desired to take a second pressure reading without unscrewing the adapter from the spark plug hole.

In the form of the invention illustrated in FIGURES 5, 6 and 7, I utilize a flexible drive shaft 45 encased in a conduit or hose 46 to form a torsion drive member for rotatably driving a fitting 47 from a connector 48 connected to an inlet 17 to a gauge head (not shown). The conduit 46 may be a rubber or neoprene conduit clamped to the respective fitting 47 and connector 48 by adapters 49 and 50a respectively, in a manner similar to which the conduit 16 is clamped and sealed to the fitting 12 and connector 19.

The flexible drive shaft 45 may be of any well known form, and is shown in FIGURE 4 as being spaced radially inwardly from the inner wall of the conduit 46. The flexible drive shaft 45 has squared ends 50 and 51 at opposite ends thereof. The squared ends 50 and 51 loosely engage mating sockets 52 and 53 in the respective fitting 47 and connector 48, providing a drive from the connector 48 to the fitting 47 upon turning of the gauge head 13. The sockets 52 and 53 provide clearance between the respective squared drive ends 50 and 51 of the flexible drive shaft 45, to accommodate the passage of air past said sockets from the cylinder of the engine to the gauge 15, to test the compression of the cylinder.

In this form of the invention, while the passage through the conduit 46 is restricted by the flexible drive shaft 45 and the squared drive ends 50 and 51 thereof, less volume of air in the combustion chamber is required to operate the gauge, than in the form of the invention shown in FIGURES 1, 2 and 3.

While I have herein shown and described several forms in which my invention may be embodied, it should be understood that various other modifications and variations in the invention may be attained without departing from the spirit and scope of the novel concepts thereof, as defined by the claims appended hereto.

I claim as my invention:

1. In a compression tester particularly adapted to test the compression of internal combustion engines, a fitting for threading within a spark plug hole, a check valve in said fitting positioned in the combustion chamber of a cylinder upon threading said fitting within a spark plug hole, a flexible drive conduit sealed to said fitting and conducting pressure from the spark plug hole and providing the torque to thread and seal said fitting to the spark plug hole by turning movement of said conduit, a connector sealed to the opposite end of said flexible conduit from said fitting and operable to turn said flexible conduit and fitting upon turning movement of said connector, a pressure gauge including a gauge head secured to said connector and adapted to be turned by the hand to thread and seal said fitting to a spark plug hole, said fitting having an inner head, a large diameter threaded portion spaced outwardly of said head and a small diameter threaded portion spaced outwardly of said large diameter threaded portion, an O-ring separating said threaded portions and a second O-ring separating said larger diameter threaded portion from said head, whereby said fitting may be selectively threaded in and sealed to small and large diameter spark plug holes by turning movement of said gauge by the hand.

2. In a compression tester particularly adapted to test the compression of internal combustion engines, a flexible conduit conducting pressure from a combustion chamber of a cylinder of an engine and having the torsional strength to form a torsion drive member, a fitting for threading in a spark plug hole, a seal extending about said fitting, sealing said fitting to a spark plug hole, a check valve in said fitting positioned in the combustion chamber of an engine upon threading said fitting within the spark plug hole, said fitting having an outer head and a threaded nipple extending outwardly therefrom, an adapter threaded upon one end of said flexible conduit and threaded on said threaded nipple and threading said conduit on said nipple and providing the torque between said conduit and fitting to thread said fitting in a spark plug hole, upon turning movement of said conduit, an adapter threaded on the opposite end of said flexible conduit from said fitting, a connector having a threaded nipple extending therefrom, said last mentioned adapter having threaded engagement with said threaded nipple extending from said connector and threading said flexible conduit on said connector and providing the torque to turn said conduit upon turning movement of said connector, and a pressure gauge having a gauge head secured to said connector and turning said connector and flexible conduit upon the exertion of a turning force on said gauge head by the hand, to thread and seal said fitting to a spark plug hole, and designating the compression of the engine.

3. A compression tester in accordance with claim 2 in which the fitting has a head extending outwardly of said threaded nipple, a larger diameter threaded portion spaced outwardly of said head and a small diameter threaded portion spaced outwardly of said large diameter threaded portion with an O-ring separating said threaded portions and a second O-ring separating said large diameter threaded portion from said head whereby said fitting may be threaded in and sealed to small and large diameter spark plug holes by turning of said gauge by the hand.

References Cited by the Examiner

UNITED STATES PATENTS

| 736,607 | 8/1903 | Lane | 64—2 X |
|---|---|---|---|
| 932,504 | 8/1909 | Sloper | 73—420 |
| 2,704,005 | 3/1955 | Clayson | 64—2 X |
| 2,823,542 | 2/1958 | Walraven et al. | 73—116 |
| 2,825,364 | 3/1958 | Cullen et al. | 138—130 X |

FOREIGN PATENTS

| 984,737 | 7/1951 | France. |
|---|---|---|

OTHER REFERENCES

Advertising Brochure from Lanagan and Hoke, Inc., Philadelphia, Pa., 1944, page 7.

RICHARD C. QUIESSER, *Primary Examiner.*

ROBERT L. EVANS, DAVID SCHONBERG,
*Examiners.*